Patented Oct. 27, 1953

2,657,216

UNITED STATES PATENT OFFICE 2,657,216

HALOGENATION OF BENZENES CONTAINING SULFUR IN THEIR ALLYLIC OR PROPENYLIC SIDE CHAINS AND PRODUCTS OBTAINED THEREBY

Olivier Gaudin, Neuilly-sur-Seine, France

No Drawing. Original application July 23, 1947, Serial No. 763,167. Divided and this application May 4, 1951, Serial No. 224,672. In Great Britain January 30, 1948

Section 1, Public Law 690, August 8, 1946
Patent expires January 30, 1968

2 Claims. (Cl. 260—327)

This invention relates to a new class of additive compounds containing a halogen and a benzene containing sulfur in the allylic or propenylic side chain, and to processes for preparing such additive compounds. Such compounds are known as halogenated additive derivatives of dithiole-1-2-thiones-3. Certain of these novel compounds are particularly useful for therapeutic purposes and for preparative work.

The benzene components of the class of compositions of matter of my present invention consist of organic substances resulting from the action of sulfur on one or more organic substances of the general formula R—R', in which R represents phenyl and R' represents a side chain comprising at least 3 carbon atoms such as an allyl or a propenyl radical. These benzenes are disclosed and claimed in U. S. application No. 763,167, filed July 23, 1947, now Patent No. 2,556,963, of which the present application is a division.

In accordance with the above-named patent, the new benzenes are obtained chemically pure in their crystallized form. Their molecule contains 3 atoms of sulfur. One of these benzenes results from the action of sulfur on anethol or on its isomer estragole. A crystallized substance has been isolated from this composition: trithioparamethoxyphenylpropene.

In the manufacture of this class of benzenes, use may be made of elementary sulfur in any one of its varieties as well as of substances easily liberating sulfur, such as polysulfides or halogen sulfides, for instance. Various compounds of vegetal origin such as estragole, eugenol, safrole, amongst the allyl compounds; anethol, iso-eugenole, iso-safrole, amongst the propenyl compounds, may be used as organic substances.

It is also possible to employ natural oils containing any of the above-mentioned substances such as anise oil for anethol; alternatively, it is also practicable to use synthetic products of the general type set forth above, for instance allyl phenols prepared according to the well known Claisen process.

The process according to the present invention may be carried out in the presence of suitable catalysts, such as vulcanization catalysts. It is also possible to operate in the presence of solvents.

The halogen containing inorganic products which may add to the aforesaid dithiolethiones, in order to form the halogenated additive compounds contemplated in the present invention, are halogenated derivatives of elements belonging to the 4th, 5th, 6th, 7th families of the periodic system of elements. Moreover, these inorganic halides are characterized by the fact that they can undergo hydrolysis giving an hydracid and an acidic oxygenated compound.

It must be noted that the inorganic halides used in the prior art to form additive compounds with sulfuretted products give by hydrolysis an hydracid and a basic oxygenated compound (for instance HgO from $HgCl_2$).

The following examples may serve to clear up the preceding statements:

*4th family.*—consider the case of stannic chloride ($SnCl_4$). By alkaline ($NH_3$) hydrolysis, the tetrachloride gives stannic acid $SnO_3H_2$.

*5th family.*—Antimony trichloride ($SbCl_3$) by hydrolysis gives antimonous oxyde $Sb_2O_3$, the acid anhydride corresponding to antimonites.

In the same way, antimony pentachloride ($SbCl_5$) gives antimonic oxyde $Sb_2O_5$, the acid anhydride corresponding to antimoniates.

As inorganic acid chlorides, the bismuth trichloride $BiCl_3$ undergoes easily hydrolysis giving BiOCl.

*6th family.*—As examples, we have taken thionyl chloride and sulfuryl chloride. By hydrolysis, the former yields sulfurous acid and the latter yields sulfuric acid.

*7th family.*—As examples, we have taken the elementary halogens themselves. They comply to the general requirement, as their hydrolysis gives, in surplus of the halohydric acid, an oxygenated acid: the hypohalogenous acid.

Chlorine with water reacts slowly to give hydrochloric and hypochlorous acid.

Bromine, in the same way gives hydrobromic and hypobromous acid.

Iodine, in the same way gives hydroiodic and hypoiodous acid.

In the prior art, it was already known that a number of sulfuretted compounds are able to add metallic halides whose metal belongs to the 1st or the 2nd family of the periodic system of elements. Amongst these metals, mercury has been very often used.

On the contrary, additive compounds with halogenides of elements of the higher families (4th and upwards) are almost completely unknown. For instance, the inventor has been unable to find in the prior art any example of additive reaction between thionyl chloride and any type of sulfuretted organic compound.

The new types of additive compounds contemplated in the present invention may be used for the chemical preparation of the pure diothiolethiones, and as the latter, are thus of practical value. Certain of these additive compounds are particularly useful for therapeutic purposes.

*Example*

One mol of triothiparamethoxyphenylpropene (240 g.) is dissolved into 10 litres of benzene.

Independently, one mol (254 g.) of iodine is dissolved into 8 litres of benzene.

The two solutions are mixed, and then left over to crystallize. The red crystals which are obtained are separated by filtration. Their gross formula is:

$$C_{10}H_8OS_3I_2$$

What is claimed is:

1. As a new composition of matter, diiodotrithioparamethoxyphenylpropene having the formula $CH_3O—C_6H_4—C_3HS_3I_2$.

2. A process for preparing a new composition of matter comprising the steps of dissolving one mol of trithioparamethoxyphenylpropene in benzene, dissolving independently thereof two mols of iodine in benzene, pouring the latter solution slowly into the first solution, allowing the two solutions to crystallize, and separating the crystals by filtration.

OLIVIER GAUDIN.

References Cited in the file of this patent

UNITED STATES PATENTS

| Number | Name | Date |
|---|---|---|
| 2,556,963 | Gaudin | June 12, 1951 |

OTHER REFERENCES

Lozac'h et al., C. A., vol. 42, p. 2241 (April 1948).